United States Patent [19]

Gibson et al.

[11] Patent Number: 5,191,059

[45] Date of Patent: Mar. 2, 1993

[54] ISOQUINOLINE-CONTAINING POLY(REISSERT COMPOUNDS)

[75] Inventors: Harry W. Gibson; Yajnanarayana H. R. Jois, both of Blacksburg

[73] Assignee: Virginia Tech Intellectual Properties, Inc., Blacksburg, Va.

[21] Appl. No.: 685,378

[22] Filed: Apr. 15, 1991

[51] Int. Cl.$^5$ ............................................. C08G 12/26
[52] U.S. Cl. ................................. 528/220; 528/228; 528/271; 528/335; 528/363; 528/370; 528/372; 528/423; 528/425
[58] Field of Search ............... 528/220, 228, 271, 335, 528/363, 370, 372, 423, 425

[56] References Cited

U.S. PATENT DOCUMENTS

| | | | |
|---|---|---|---|
| 4,868,271 | 9/1989 | Dahl et al. | 528/171 |
| 4,929,713 | 5/1990 | Gibson et al. | 528/230 |
| 5,041,601 | 8/1991 | Gibson et al. | 558/392 |
| 5,066,773 | 11/1991 | Gibson et al. | 528/362 |

OTHER PUBLICATIONS

Guilani et al., "4,4'-Coupled Bis (Isoquinolines)", Polymer Preprints, vol. 30, No. 1, Apr. 1989, pp. 1007-1009.
Gibson et al., "Synthesis of Novel 4,4'-Coupled Bis-Isoquinolines" Polymer Preprints, vol. 30, No. 1, Apr. 1989; pp. 208-209.
Pandya et al., "A New and Economical Synthesis of Reissert Compounds" Polymer Preprints, vol. 30, No. 1, Apr. 1989, pp. 206-207.

Primary Examiner—John Kight, III
Assistant Examiner—S. A. Acquah
Attorney, Agent, or Firm—Richard P. Fennelly; Louis A. Morris

[57] ABSTRACT

Poly (Reissert compounds) can be formed by reaction of a coupled bis(isoquinoline), e.g., a 4,4'- coupled bis-(isoquinoline), a diacid chloride, e.g. adipoyl chloride, and a source of cyanide, e.g., trimethylsilyl cyanide.

16 Claims, 2 Drawing Sheets

$X=10, (C_{50}H_{52}N_4O_4)_n (773)_n$

ISOQUINOLINE-CONTAINING POLY(REISSERT COMPOUNDS)

BACKGROUND OF THE INVENTION

Recent interest has been focused upon the synthesis of heterocyclic polymers having high temperature properties for structural and adhesive end uses as well as use as catalysts and water-soluble and conducting polymers. For example, Polymer Preprints, 30(1), pp. 206-207 and 208-209 report various bis(Reissert) compounds of isoquinoline and indicate, without further explanation, that such bis(Reissert) compounds can be used in the synthesis of novel heterocyclic polymers. More recently, J. Heterocyclic Chem., 27, 1007-1009 (1990) reports the synthesis of 4,4'-coupled bis(isoquinolines) and also indicates, without further elucidation, that those compounds allow for polymer production using Reissert compound chemistry. H. W. Gibson et al. in Macromolecules, 1990, 23, 4339 describe the synthesis of polyesters from bis(isoquinoline) benzoyl Reissert compounds via condensation of the dianions with dialdehyde.

DESCRIPTION OF THE PRESENT INVENTION

The present invention relates to heterocyclic polymers formed by the reaction of a diacid halide, e.g., a diacid chloride such as adipoyl chloride, with a coupled bis(isoquinoline).

The coupled bis(isoquinoline) compounds which can be used as one monomer for the polymerization reaction described herein are described in certain of the aforementioned publications.

One class of 4,4'-coupled bis(isoquinolines) are described in Polymer Preprints, 30(1), pp. 208-209 where various bis(aldehydes) prepared by the condensation of p-hydroxybenzaldehyde with a selected $\alpha,\omega$-dibromoalkane were used to form bis-isoquinolines. A more recent description of 4,4'-coupled bis(isoquinolines) which can be used is contained in J. Heterocyclic Chem. 27, 1007-1009 (1990) in which dialdehydes are reacted with sodium triethyl-[2-[1,2-dihydroisoquinolyl]borane to form the coupled bis(isoquinolines).

The other reagent used in the formation of the desired polymers or poly(Reissert compounds), containing the isoquinoline structures is a diacid halide, e.g., a diacid chloride, which can be either aromatic or aliphatic in nature.

BRIEF DESCRIPTION OF DRAWINGS

The polymerization reaction is a Reissert reaction using the aforementioned coupled bis(isoquinoline) and diacid chloride as monomers with an appropriate cyanide source, e.g., trimethylsilyl cyanide.

Figure 1:
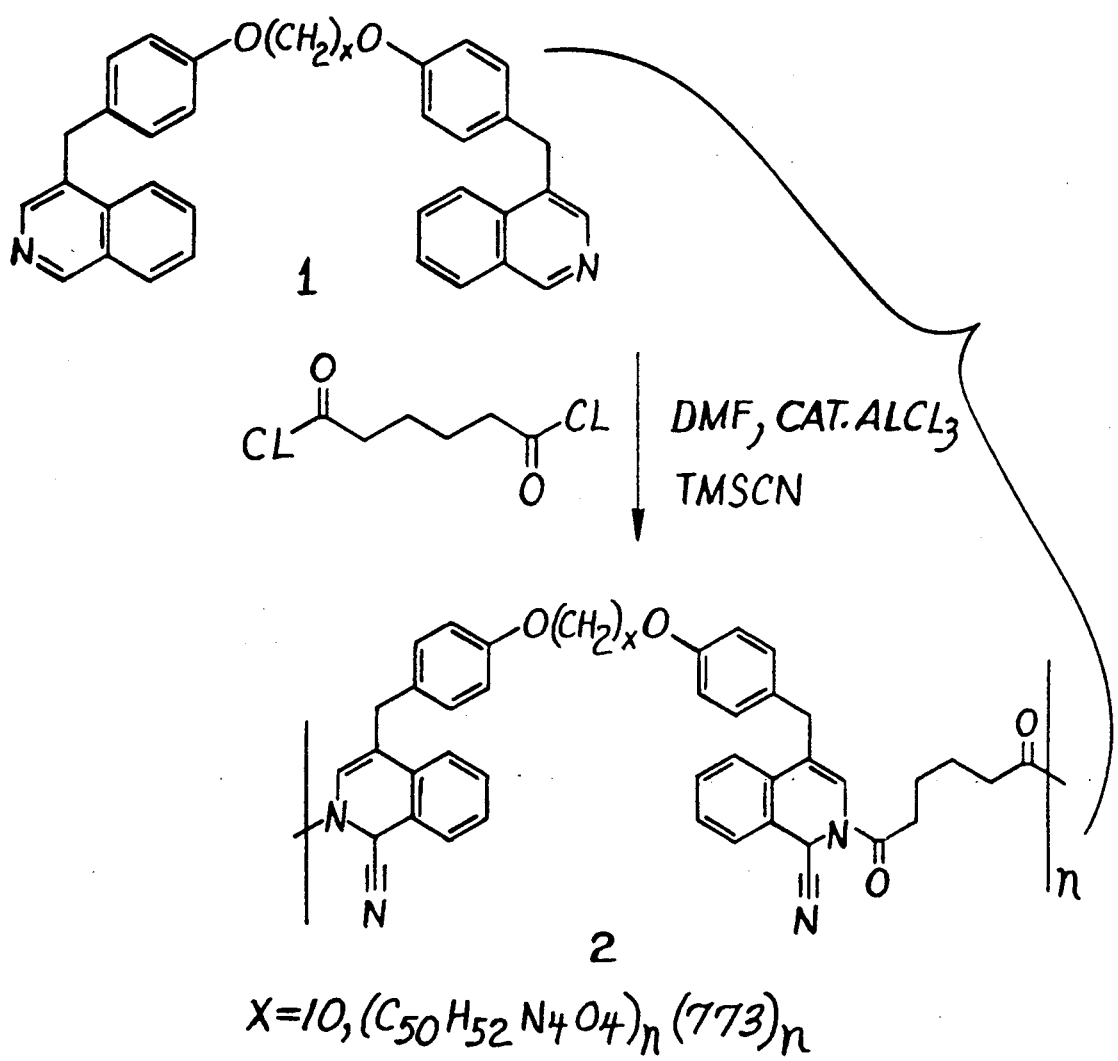
FIG. 1 illustrates one particular type of poly(Reissert compound), designated by 2, which can be synthesized from coupled bis(isoquinoline) compound 1.
Figure 2:
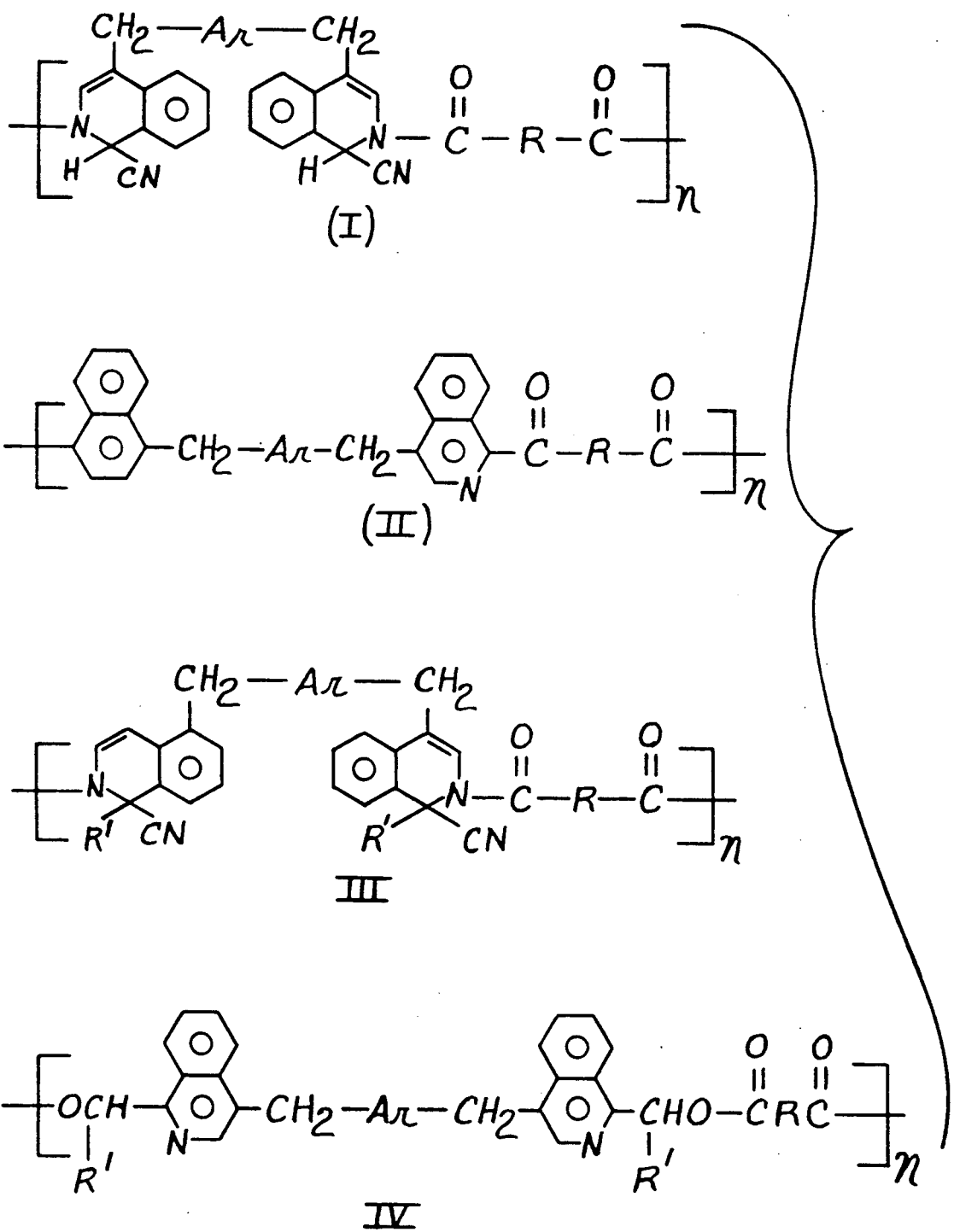

Poly(Reissert compounds) prepared in accordance with the invention (Structure I in FIG. 2 (the bridging group shown in these particular structures is —$CH_2C_6H_4$—$CH_2$—)) can be subject to chemical modification via the acidic proton which is alpha to the nitrile moiety. Thus, poly(aromatic ketones) can be produced by base-promoted rearrangement to yield the type of Structure II of FIG. 2. In another embodiment, alkylation of the anion produced by deprotonation (e.g., with RX) can form alkylated derivatives (Structure III in FIG. 2). A third embodiment involves the production of polyesters by condensation with an aldehyde (e.g., RCHO) to give Structure IV in FIG. 2. Such modifications allow one to tailor the bulk and/or surface properties, for example, to improve the dispersibility, adhesion, release, or mechanical behavior of the basic bromo- or copolymers formed by this invention.

A particular embodiment of the present invention is described in more detail in the Example which follows.

EXAMPLE

This illustrates the formation of an isoquinoline-containing poly(Reissert compound) of structure 2 as shown in the Figure.

The particular 4,4'-coupled bis(isoquinoline), shown by structure 1, in the Figure was prepared as described in J. Heterocyclic Chem., 27 1007-1009 (1990) by appropriate reaction of isoquinoline with 1,10-bis(p-formylphenoxy)decane and sodium triethylborohydride in tetrahydrofuran.

To a well stirring solution of the compound 1 in the Figure (8.95 mmole, 5.4493 gm) and a catalytic amount of aluminum trichloride (about 100 mg or less) in dry dimethylformamide (40 ml) under dry conditions in a nitrogen atmosphere was added adipoyl chloride (8.95 mmole, 1.6382 gm) in 10 ml of dry dimethylformamide. The resulting mixture was stirred for twenty minutes followed by addition of trimethylsilyl cyanide (20 mmole, 3 ml). The reaction mixture was stirred for three days at 25° C. and was quenched by pouring into water (3 liters). The solid obtained was consecutively treated with water (1 liter), aqueous HCl (1 liter, pH=5), aqueous sodium bicarbonate (1 liter, pH=9), water (1 liter), methanol (1 liter), and was dried (40° C./1 mm) to obtain the desired polymer product (5.14 gm). Analysis revealed: [H]=0.15 dL/gm (THF, 25° C.); IR (KBr): 2927; 2855 (C—H), 1738, 1732, 1714, 1682, 1675, 1651, 1639, 1634, 1611, 1582, 1574, 1511, 1495 cm$^{-1}$; GPC (THF, absolute values): $M_n$=1500; $M_w$=21000, $M_v$=9900. TGA: thermally stable up to 225° C. (10% wt loss in air); DSC: $T_g$=87° C.

The foregoing Example is presented for illustrative purposes only and should not be construed in a limiting sense for that reason. The scope of protection sought is set forth in the claims which follow.

We claim:

1. A poly(Reissert compound) formed by reaction of a coupled bis(isoquinoline), a diacid chloride, and a source of cyanide.

2. A poly(Reissert compound) as claimed in claim 1 wherein the bis(isoquinoline) is a 4,4'-coupled bis(isoquinoline).

3. A poly(Reissert compound) as claimed in claim 1 wherein the bis(isoquinoline) is a 4,4'-coupled bis(isoquinoline) and the diacid chloride is an aliphatic diacid chloride.

4. A poly(Reissert compound) as claimed in claim 3 wherein the diacid chloride is adipoyl chloride.

5. A poly(aromatic ketone) which has been produced by base rearrangement of a poly(Reissert compound) as claimed in claim 1.

6. A poly(aromatic ketone) which has been produced by base rearrangement of a poly(Reissert compound) as claimed in claim 2.

7. A poly(aromatic ketone) which has been produced by base rearrangement of a poly(Reissert compound) as claimed in claim 3.

8. A poly(aromatic ketone) which has been produced by base rearrangement of a poly(Reissert compound) as claimed in claim 4.

9. An alkylated derivative of the poly(Reissert compound) as claimed in claim 1.

10. An alkylated derivative of the poly(Reissert compound) as claimed in claim 2.

11. An alkylated derivative of the poly(Reissert compound) as claimed in claim 3.

12. An alkylated derivative of the poly(Reissert compound) as claimed in claim 4.

13. A polyester which has been formed by condensation of an aldehyde with a poly(Reissert compound) as claimed in claim 1.

14. A polyester which has been formed by condensation of an aldehyde with a poly(Reissert compound) as claimed in claim 2.

15. A polyester which has been formed by condensation of an aldehyde with a poly(Reissert compound) as claimed in claim 3.

16. A polyester which has been formed by condensation of an aldenyde with a poly(Reissert compound) as claimed in claim 4.

* * * * *